R. H. PRESTIEN.
FRUIT DIPPER.
APPLICATION FILED JUNE 7, 1912.
1,057,269.
Patented Mar. 25, 1913.
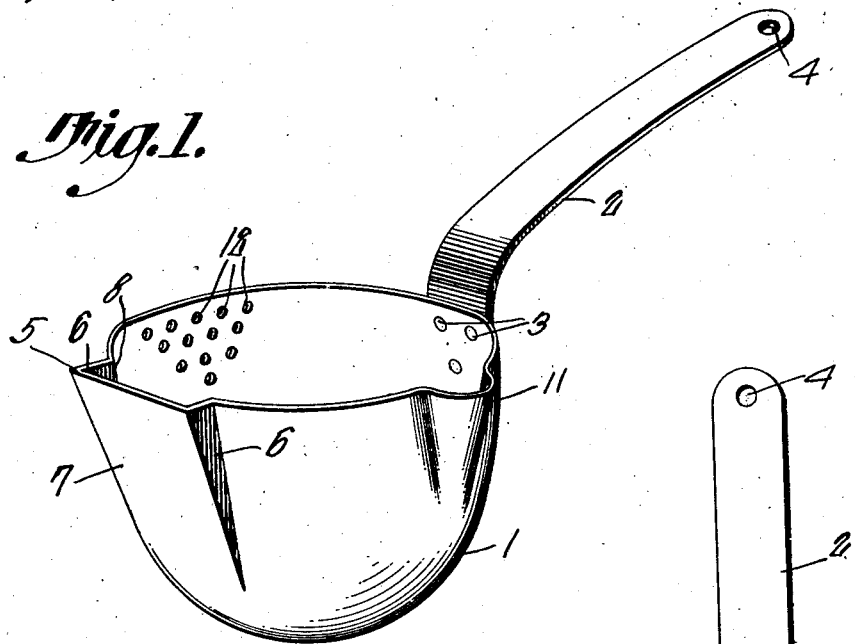
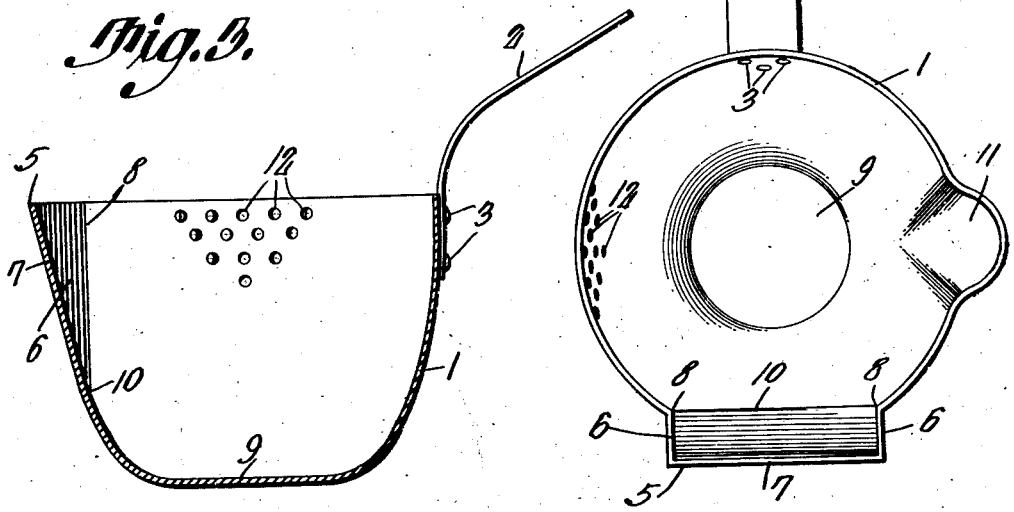
Robert H. Prestien, Inventor
Witnesses
by C. A. Snow & Co., Attorneys

UNITED STATES PATENT OFFICE.

ROBERT H. PRESTIEN, OF NORFOLK, VIRGINIA.

FRUIT-DIPPER.

1,057,269.　　　　Specification of Letters Patent.　　Patented Mar. 25, 1913.

Application filed June 7, 1912. Serial No. 702,303.

*To all whom it may concern:*

Be it known that I, ROBERT H. PRESTIEN, a citizen of the United States, residing at Norfolk, in the county of Norfolk and State of Virginia, have invented a new and useful Fruit-Dipper, of which the following is a specification.

The device forming the subject-matter of this application is a dipper adapted to be employed for transferring fruit and like material, during the preserving process, from the cooking receptacle into a jar.

The invention aims to provide a dipper which may readily be scraped along the bottom of the cooking receptacle, to effect an accumulation of the material in the dipper, means being provided whereby the excess juice may be drained away.

Another object of the invention is to provide a dipper of the type specified, in which, during the operation of scraping up the material, the material will be directed toward the center of the dipper, and away from both the drainage openings and the delivery spout.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in perspective; Fig. 2 is a top plan; and Fig. 3 is a vertical transverse section.

The dipper forming the subject-matter of this application is fashioned preferably from metal and comprises an approximately semi-spherical bowl or body 1, to which an outstanding handle 2 is secured by means of rivets 3 or in any other desired manner, the handle 3 being terminally provided with an opening 4, defining a suspension eye. Located opposite to the handle 2 is an intake or scraping spout denoted generally by the numeral 5. The scraping spout 5 comprises flat side walls 6 and a flat outer wall 7. The flat side walls 6 lie parallel to a diameter which, if prolonged, would pass longitudinally through the handle 2. The side walls 6 intersect the body 1 along a line 8 which is at right angles to the bottom 9 of the body 1, the body 1 ordinarily being flattened slightly, to form the bottom. The lower end of the outer wall 7 of the intake or scraping spout 5 intersects the body 1 along a line 10 which is parallel to the bottom 9. Located between the handle 2 and the spout 5 is a delivery spout 11 which is of semi-conical form. The delivery spout 11 is approximately 90° remote from the handle 2 and from the intake spout 5. The side wall of the body 1 is provided, intermediate the handle 2 and the spout 5, and diametrically opposite to the delivery spout 11, with a plurality of drainage openings 12. The drainage openings 12 are preferably disposed in the form of a triangle, one side of which is parallel to the edge of the body 1, the apex of the triangle being downwardly disposed, as will be understood most readily from an inspection of Fig. 1. The outer wall 7 of the scraping spout 5 lies parallel to a diameter passing through the spout 11 and through the apex of the triangle formed by the openings 12, the side walls 6 being disposed at right angles to this diameter.

As will be understood readily, the body 1 is inserted into the fruit or other material, and when a desired quantity thereof is contained in the body, the body is lifted out of the receptacle, whereupon the excess juice will drain away through the openings 12. Owing to the triangular form in which the openings are arranged, the drainage will take place more rapidly when the body 1 is nearly full, an overflowing of the body 1 being thereby avoided. Owing to the triangular form in which the openings 12 are arranged, the juice will drain away with less rapidity, as the depth in the material in the body 1 decreases. It is therefore possible for the operator to tilt the body 1 slightly, so that the level of the liquid lies below the lowermost opening 12. The juice will drain away rapidly, at first, through the uppermost openings 12, thereby avoiding an overflowing of the body 1. Subsequently, the juice will drain away with less rapidity, and the operator, at any time, may stop the draining of the juice, by the operation above described.

As will be understood readily, the spout 11 constitutes a convenient means for pouring the fruit and the juice into a can or the like.

When it is desired to scrape up the fruit into the body 1, the spout 5 is passed along the bottom of the receptacle in which the fruit is contained, and owing to the flat form of the outer wall 7, the bottom of the receptacle may be scraped clean. During this scraping operation, the side walls 6 of the spout 5 will serve to direct the material toward the center of the body 1 and away from the openings 12 and from the spout 11. Consequently, when the spout 5 is drawn along the bottom of the receptacle, the material will not tend to flow laterally along the walls of the body, into the openings 12 and into the spout 11. The foregoing feature is of importance when it is recalled that when there is but little material in the cooking receptacle, the scraping operation necessarily takes places with rapidity, the material being projected into the body 1 of the dipper with considerable force. Owing to the fact that the spout 5 is positioned directly opposite to the handle 2 a maximum scraping pressure may be exerted, and at the same time, the upper edge of the wall 7 may be held in contact, throughout its entire length, with the bottom of the cooking receptacle.

Having thus described the invention, what is claimed is:—

A dipper comprising a body having a radially projecting handle and provided with a flat scraping spout disposed diametrically opposite to the handle and including flat side walls, the body having a drainage opening adjacent its edge and being provided with a pouring spout, independent of the scraping spout, the pouring spout being disposed opposite to the drainage opening, the drainage opening and the pouring spout being located 90 degrees remote from the handle and from the scraping spout, the side walls of the scraping spout being located at right angles to a diameter passing through the drainage opening and through the pouring spout.

In testimony that I claim the foregoing as my own, I have hereto affixed my signature in the presence of two witnesses.

ROBERT H. PRESTIEN.

Witnesses:
L. R. MATTHEWS,
WM. H. FRANCIS.